(12) United States Patent
Narala (10) Patent No.: US 9,604,143 B1
(45) Date of Patent: Mar. 28, 2017

(54) SYSTEMS AND METHODS OF PLAYING A GAME ON A MOBILE DEVICE

(71) Applicant: BB GLOBAL PLAYERS, LLC, Edison, NJ (US)

(72) Inventor: Mahender Narala, Edison, NJ (US)

(73) Assignee: BB Global Players, LLC, Edison, NJ (US)

( * ) Notice: Subject to any disclaimer, the term of this patent is extended or adjusted under 35 U.S.C. 154(b) by 287 days.

(21) Appl. No.: 14/549,761

(22) Filed: Nov. 21, 2014

(51) Int. Cl.
*A63F 13/00* (2014.01)
*A63F 13/428* (2014.01)
*G06F 17/30* (2006.01)
*A63F 13/50* (2014.01)
*A63F 13/211* (2014.01)
*A63F 13/45* (2014.01)

(52) U.S. Cl.
CPC .......... *A63F 13/428* (2014.09); *A63F 13/211* (2014.09); *A63F 13/45* (2014.09); *A63F 13/50* (2014.09); *G06F 17/30769* (2013.01)

(58) Field of Classification Search
CPC ...... A63F 13/211; A63F 13/428; A63F 13/45; G06F 17/30769
See application file for complete search history.

(56) References Cited

U.S. PATENT DOCUMENTS

| | | | | |
|---|---|---|---|---|
| 5,139,267 A * | 8/1992 | Trevisan | ............. | A63F 3/00082 273/246 |
| 5,486,006 A * | 1/1996 | Bruno | ................ | A63F 3/00119 273/301 |
| 8,753,184 B2 * | 6/2014 | Goldenberg | .......... | A63F 13/005 273/429 |
| 9,348,903 B2 * | 5/2016 | Moran | ................ | G06F 17/3074 |
| 2005/0054441 A1 * | 3/2005 | Landrum | ................ | A63F 13/10 463/35 |
| 2006/0287029 A1 * | 12/2006 | Yoshinobu | .............. | A63F 13/10 463/9 |
| 2012/0032877 A1 * | 2/2012 | Watkins, Jr. | .......... | G06F 1/1624 345/156 |

(Continued)

OTHER PUBLICATIONS

Parker, Jason. Heads Up for iOS review [online]. May 3, 2013 [retrieved Oct. 28, 2016]. Retrieved from the Internet: <URL: https://www.cnet.com/products/heads-up-ios/review/>.*

(Continued)

*Primary Examiner* — Dmitry Suhol
*Assistant Examiner* — David Duffy
(74) *Attorney, Agent, or Firm* — Eric L. Sophir; Dentons US LLP (57) ABSTRACT

The system and/or method comprising: receiving, from a user on a computing device, input selecting a first country from a plurality of countries; receiving, from the user on the computing device, input selecting a first category of songs from a plurality of categories of songs; displaying, on the computing device, a chorus of a song from the selected category of songs, wherein the chorus is the main verse of the song; upon displaying the song on the computing device, displaying a timer indicating a predetermined threshold period of time; and displaying, by the computing device, a chorus of a second song from the selected category of songs, when the predetermined threshold period of time is exhausted.

18 Claims, 7 Drawing Sheets

(56) References Cited

U.S. PATENT DOCUMENTS

| | | | | |
|---|---|---|---|---|
| 2012/0178527 A1* | 7/2012 | Kaskie | A63F 13/80 | 463/31 |
| 2012/0238350 A1* | 9/2012 | Sarig | A63F 13/10 | 463/25 |
| 2013/0252729 A1* | 9/2013 | Wells | A63F 13/00 | 463/31 |
| 2013/0267287 A1* | 10/2013 | Goldenberg | A63F 13/005 | 463/10 |
| 2014/0228130 A1* | 8/2014 | Moran | G06F 17/3074 | 463/43 |
| 2015/0050998 A1* | 2/2015 | Stelovsky | A63F 13/60 | 463/31 |

OTHER PUBLICATIONS

Hodapp, Eli. As Featured on "The Ellen Show," 'Heads Up!' is a Party Game You Need [online]. May 2, 2013 [retrieved on Oct. 28, 2016]. Retrieved from the Internet: <URL: http://toucharcade.com/2013/05/02/as-featured-on-the-ellen-show-heads-up-is-a-party-game-you-need/>.*

* cited by examiner

COUNTRY
USA
    CATEGORY 1
    CATEGORY 2
    CATEGORY 3
INDIA
    STATE 1
        MALE
        FEMALE
        DUET
        WILD
    STATE 2
        MALE
        FEMALE
        DUET
        WILD
    STATE 3
CHINA
    CATEGORY 1
    CATEGORY 2
    CATEGORY 3

PAKISTAN
    CATEGORY 1
    CATEGORY 2
    CATEGORY 3

MEXICO
    CATEGORY 1
    CATEGORY 2
    CATEGORY 3

SYSTEMS AND METHODS OF PLAYING A GAME ON A MOBILE DEVICE

TECHNICAL FIELD

The present application relates generally playing a game on a mobile device.

BACKGROUND

Games are widely used as a means for family and friendly entertainment. Many games include a game board, game pieces, and some means to advance the game pieces around the board. A number of such board games have had musical themes. For example, a board game directed to the players' knowledge of music to answer music trivia questions. Question cards relate to song titles, artists and lyrics.

Other games, such as the game of charades requires usually a large poster board to draw pictures. Charades a game where words or phrases are acted out amongst players with the object being to correctly guess the word or phrase in play, including the actual drawing or sketching of the meaning of the word or phrase instead of acting.

However, in the digital age, many people do not carry board games with them to play while visiting a friend or family. Most of the time, people decide to play a game at the spur of the moment. Furthermore, many people today have decided to promote being environmentally friendly do not store large poster boards of paper to draw pictures in their own home. A need exists to create a mobile phone game which is friendly to the environment and promotes impromptu game play. To date, no game has existed that incorporates the themes of both charades and acting out the chorus of songs including an international database of songs categorized by country on a mobile device.

SUMMARY

The embodiments described herein provide a game on a mobile device. The mobile device presents a graphical user interface that allows two or more players to participate in the game using the mobile device. To play, the two or more players select a song category. The categories may comprise song lyrics based on different countries. A first player may then hold the mobile device to their forehead or in a manner so that the first player cannot see the screen of the mobile device. At this time, the first player has a predetermined period of time (e.g., 60 seconds) where a main chorus and/or verse of a song from a particular category will appear on the screen to guess the song. The second player and/or any other player may look at the screen and act out the verse of the song. If the first player guesses correctly, the first player may tilt and/or shake the mobile device in a particular direction (e.g., up and/or down) and obtain a point. If the first player does not guess the song correctly and wants to take a pass on the particular song, the first player may tilt and/or shake the mobile device in an opposite direction (e.g., down and/or up). No points are awarded, and a second song appears on the mobile device. In some implementations, instead of tilting and/or shaking the mobile device, a user may select a tab and/or button on the mobile device to present the next song. The mobile device has a graphical user interface and database of song information to provide this functionality of the game.

In one embodiment, the system and/or method may comprise: querying, by a computing device, a storage device for lyrics of a chorus of a first media record from a category of media records upon receiving an inputted selection of the category of media records from a plurality of category of media records; displaying, by the computing device, the lyrics of the chorus of the first media record from the selected category of media records; upon displaying the lyrics of the chorus of the first media record on the computing device, displaying, by the computing device, a timer indicating a predetermined threshold period of time; determining, by the computing device, a position of the computing device based upon data from a sensor in the computing device; upon a determination that the computing device has changed the position beyond a first threshold amount, displaying, by the computing device, lyrics of a chorus of a second media record from the selected category of media records, and upon a determination that the computing device has changed beyond a second threshold amount, adjusting, by the computing device, a record to reflect a change in a score; and displaying, by the computing device, lyrics of a chorus of the second media record from the selected category of media records; and upon exhaustion of the predetermined threshold of time for displaying the lyrics of the chorus of the first media record without a determination that the computing device has changed the position beyond the first threshold amount and the second threshold amount, displaying, by the computing device, the second media record. The sensor may be one or more of: a gyroscope and an accelerometer. Changing the position may be based on tilt angle, wherein the first threshold amount is tilting the device upwards beyond a 45 degree angle and/or any other angle. The second threshold amount may be tilting the device downwards beyond a 45 degree angle and/or any other angle. Changing the position may based on shaking the device. The first threshold amount may be shaking the device vertically. The second threshold amount may be shaking the device horizontally.

In yet another embodiment, the system and/or method may comprise receiving, by the computing device, an input selecting a first country from a plurality of countries, the countries comprising a first country and a second country; receiving, from the user on the computing device, input selecting a first category of media records from a plurality of categories of media records, wherein the plurality of categories of media records are different for the first country and the second country; displaying, by the computing device, a chorus of a media record from the selected category of media records; upon displaying the media record on the computing device, displaying a timer indicating a predetermined threshold period of time; determining, by the computing device, a shaking motion; when the computing device is shaken horizontally, displaying, by the computing device, a chorus of a second media record from the selected category of media records, and when the computing device is shaken vertically, awarding a score, and displaying, by the computing device, a chorus of a second media record from the selected category of media records; and displaying, by the computing device, a chorus of a second media record from the selected category of media records, when the predetermined threshold period of time is exhausted.

In still yet another embodiment, the system and/or method may comprise receiving, by a computing device, input selecting a first country from a plurality of countries, the countries comprising a first country and a second country; receiving, by the computing device, input selecting a first category of media records from a plurality of categories of media records, wherein the plurality of categories of media records are different for the first country and the second country; displaying, by the computing device, lyrics of a chorus of a first media record from the selected category of media records; upon displaying the lyrics of the chorus of the first media record on the computing device, displaying, by the computing device, a timer indicating a predetermined threshold period of time; determining, by the computing device, a first input and a second input from the user; when the computing device receives the first input from the user, displaying, by the computing device, lyrics of a chorus of a second media record from the selected category of media records, and when the computing device receives a second input from the user, awarding a score, and displaying, by the computing device, lyrics of the chorus of the second media record from the selected category of media records; and displaying, by the computing device, lyrics of the chorus of the second media record from the selected category of media records, when the predetermined threshold period of time is exhausted.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

The embodiments described herein provide a game on a mobile device. The mobile device presents a graphical user interface that allows two or more players to participate in the game using the mobile device. A media record may store data representing a song, a movie, a television show, a book, a play, a poem, an event, a movie, and/or any other type of media. Throughout the specification, the media record is referred to as a song for exemplary purposes.

To play, the two or more players select a song category. The categories may comprise song lyrics based on different countries. A first player may then hold the mobile to their forehead or in a manner such that the first player cannot see the screen of the mobile device. At this time, the first player has a predetermined period of time (e.g., 60 seconds) where a main chorus and/or verse of a song from a particular category will appear on the screen to guess the song. The second player and/or any other player may look at the screen and act out the verse of the song. If the first player guesses correctly, the first player may tilt and/or shake the mobile device in a particular direction (e.g., up and/or down) and obtain a point. If the first player does not guess the song correctly and wants to take a pass on the particular song, the first player may tilt and/or shake the mobile device in an opposite direction (e.g., down and/or up). No points are awarded, and a second song appears. In some implementations, instead of tilting and/or shaking the mobile device, a user may select a tab and/or button on the mobile device to present the next song. The mobile device has a graphical user interface and database of song information to provide this functionality of the game.

Figure 1:
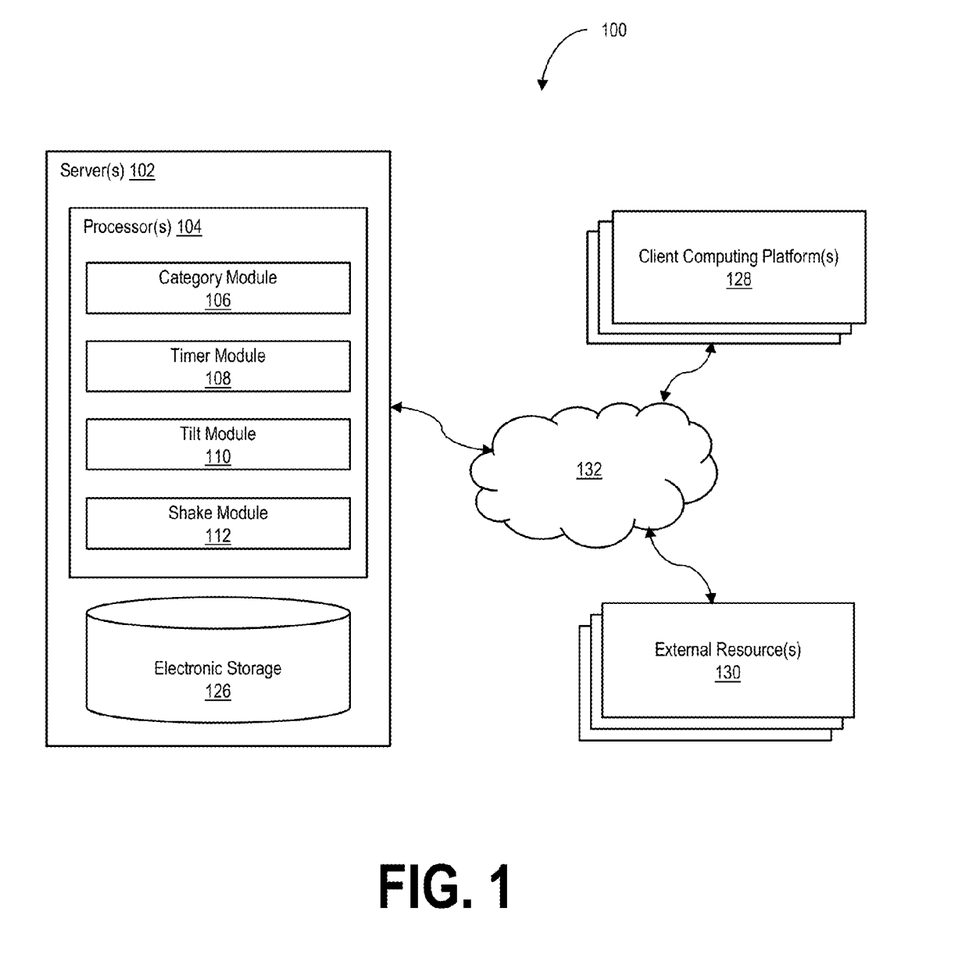
FIG. 1 illustrates a diagram of a system architecture for playing a game on a mobile device, according to an exemplary embodiment.

FIG. 1 illustrates a diagram of a system 100 architecture for playing a game on a mobile device, according to an exemplary embodiment. Although the exemplary embodiment recites that the game relates to songs and allows the users to interact with the graphical user interface of the application on a mobile device using techniques such as those in charades, it is not intended that this game be limited to international categories, international songs, only songs, and the use of charades techniques. Instead, this mobile device application can be configured for a particular country, culture, city, region, or language.

The system 100 may comprise a client computing platform(s) 128 communicating with a server(s) 102 through a network 132. The server(s) 102 may further communicate with external resource(s) 130. The server(s) 102 may be any computing device communicatively coupled over a network 132 to one or more computing devices, such as client computing platform(s) 128 and external resource(s) 130.

The server(s) 102 may comprise electronic storage 126, one or more processor(s) 104, and/or other components. Although shown in the exemplary embodiment as a server 102 comprising an electronic storage 126, it is intended that the server 102 can be one or more servers, the electronic storage 126 can be one or more storage mediums, and the server 102 and electronic storage 126 may be the same or different components. The server(s) 102 may include communication lines, or ports to enable the exchange of information with a network 132 and/or other client computing platform(s) 128 and/or external resource(s) 130. The processor(s) 104 may be configured to execute computer program modules stored on the electronic storage or other computer readable medium. The processor(s) 104 may be configured to execute the computer program modules via one or more of hardware, software, and/or firmware. Although system 100 may be described in certain sections herein as including server(s) 102, this is not intended to be limiting. For example, server(s) 102 may be implemented by a cloud of computing platforms operating together as server(s) 102.

Processor(s) 104 is configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. The processor(s) 104 may be configured to execute: a category module 106, a timer module 108, a tilt module 110, a shake module 112, and/or other modules. Processor(s) 104 may be configured to execute any modules by software, hardware, firmware, some combination of software, hardware, and/or firmware, and/or other mechanisms for configuring processing capabilities on processor(s) 104.

The server(s) 102, processor(s) 104, and/or client computing platform(s) 128 may be separate and distinct from system 100, and may be provided by an entity that is separate from, for example, the entity providing system server(s) 102. The server(s) 102, processor(s) 104, and/or client computing platform(s) 128 may be configured to execute one or more computer program modules. In some implementations, software may be downloaded to the client computing platform(s) 128 in the form of an application, and the client computing platform(s) 128 may communicate with the server(s) 102 to execute the program modules. The computer program modules may include one or more of a category module 106, a timer module 108, a tilt module 110, a shake module 112, and/or other modules.

A category module 106 when executed on a processor, server, and/or client computing platform may be configured to present multiple categories to a user on the display of the client computing platform(s) 128 (e.g., mobile device). The category module 106 may obtain information from a database which may be stored on: electronic storage 126, client computing platform(s) 128, external resource(s) 130, and/or may connect to an external network to obtain the information containing the categories.

The categories may comprise multiple countries including: the United States of America (US), India, China, Pakistan, Mexico, and/or any other country. Based on the type of country, different song options may be available for selection. In some implementations, genres may be presented for the United States including: country, pop, rock and roll, hip hop, blues, jazz, gospel, and/or any other genre. In some implementations, further categories (e.g., tiers) may be presented for each country, such as different songs presented by state and/or region based on the country. For example, for India, a first tier of the category may be a state and/or region, and the second tier of the category may comprise: male songs, female songs, duets, a wild category (e.g., including all categories), and/or any other category.

Each of the categories may be presented on a graphical user interface presented on the client computing platform(s) 128 (e.g., mobile device), and each category can be presented as a button, link, and/or other selection on the graphical user interface of the client computing platform(s) 128 and/or any other display.

A timer module 108 when executed on a processor, server, and/or client computing platform may be configured to present a count down. In some implementations, a timer may be displayed to the user. The display may show the timer in any form. For example, the timer may be displayed as a stop watch on the display, and/or the timer may be displayed in a clock form. The timer may make different sounds to indicate that a predetermined amount of time is left. For example, if 10 seconds are left, the timer may provide one ding. When 5 seconds are left, the timer may provide 2 dings. The dings may be any type of sound set up by the operator and/or user.

In some implementations, the timer may be predetermined (e.g., selected by the operator). In some implementations, the timer may be set by the user for any increment of time (e.g., 60 seconds, 120 seconds, etc.) and/or any random time. In some implementations, the timer may be set per song lyric. When the timer is set per song, if the user does not correct the song correctly in the set amount of time, a second song may be displayed. In some implementations, the timer may be set per turn (e.g., guessing the most songs correctly during the timer). When time runs out on the timer, and the user has not correctly guessed, a screen displaying the total score may be displayed.

A tilt module 110 when executed on a processor, server, and/or client computing platform may be configured to determine the tilt angle of the client computing platform(s) 128. The client computing platform(s) 128 may also include a tilt sensor. The tilt sensor may be an accelerometer and/or a gyroscope. The tilt sensor provides a tilt signal indicative of a tilt angle of the device.

A tilt-sensitive digital compass may include both the magnetometer and the accelerometer (and/or any other sensor), i.e. both the magnetometer and the accelerometer may be integrated into a single chip or client computing platform(s) 128. For example, an integrated magnetometer-accelerometer may include magneto-inductive sensors or magneto-resistive sensors with a 3-axis accelerometer in a single chip. Alternatively, the digital compass may incorporate a Hall-effect magnetic sensor. In other variants, the client computing platform(s) 128 and/or the accessory device may include a gyroscope in addition to the magnetometer and accelerometer.

The user and/or operator may set the tilt criteria including angle and/or effect. For example, the client computing platform(s) 128 may be configured to recognize a tilt angle of 45 degrees in an upward direction, and upon detecting the tilt angle of 45 degrees, the tilt module 110 can automatically designate the action as a "pass" and request that category module 106 skip to the next song lyric. The client computing platform(s) 128 may be configured by the tilt module to recognize a tilt angle of 90 degrees in a downward direction to mean "award a point" and the category module 106 may present the next song lyric. In some implementations, the tilt angles may be preselected by the software developer. In some implementations, the tile angles may be preselected by the user.

A shake module 112 when executed on a processor, server, and/or client computing platform may be configured to determine a shake and direction of the shake of the client computing platform(s) 128. In some implementations, the shake module 112 outputs a series of continuous location coordinates after sensing that the client computing platform(s) 128 is shaken. In some implementations, users can hold a client computing platform(s) 128 with a single hand and easily skip to the next song, and/or receive points and a new song with a single-handed shake operation.

An inertial sensor may detect a user's shaking action and measure the strength of shaking. Then the inertial sensor may send a measured signal to the client computing platform(s) 128. The client computing platform(s) 128 may establish a threshold value based on the measured signal and orientation of the shake and store it into electronic storage 126.

The client computing platform(s) 128 may comprise one or more sensors including: an accelerometer, a gyroscope, a global positioning sensor (GPS), a magnetometer, a proximity sensor, a light sensor, a barometer, a thermometer, an air humidity sensor, a pedometer, a heart rate monitor, a fingerprint sensor and/or any other sensor. The sensors are accessed by modules 106, 108, 110, and/or 112 to determine the next steps in the game. For example, the display screen on the client computing platform(s) 128 may display a next song, and/or end the game to the score display, based on receiving a particular reading from any of the above sensors.

The user and/or operator may set the shake criteria including direction and/or effect. For example, the user may set a shake direction of horizontal to mean "pass" and skip to the next song lyric. The user may shake direction of vertical to mean "award a point" and present the next song lyric. In some implementations, the shake direction may be preselected by the software developer.

Other modules may include a user module, which may be configured to access and/or manage one or more user profiles and/or user information associated with users of the system 100. The user profiles and/or user information associated with the users may be stored in a database in electronic storage 126. In some implementations, the user profiles and/or user information associated with the users may be stored in a database in the client computing platform(s) 128. The one or more user profiles and/or user information may include information stored by server(s) 102, one or more of the client computing platform(s) 128, and/or other storage locations.

The user profile may be a record in a database which is stored in electronic storage 126, client computing platform(s) 128, external resource(s) 130, and/or any other device. Upon logging in, the client computing platform(s) 128 presents the user profile. The profile information may be accessed by the client computing platform(s) 128 to affect features within the game. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

User profiles may be used to play virtually with other players (e.g., video chat and/or conferencing). User profiles may be accessed by the client computing platform(s) 128 and used to identify players, provide ratings for players to best match players virtually, and/or provide information to players about participants in the game. Use profiles may be accessed by the server, and/or client computing platform(s) 128. The user profiles may be updated in real time and/or may be updated in near real time. The client computing platform(s) 128 may present a log-in screen to the user where the user may access the user profile. User profile information may be updated in the user profile database by the client computing platform(s) 128 receiving input from the individual player, automatically updated based on game play on the client computing platform(s) 128, and/or updated by other players (e.g., providing player feedback) in the user profile database by the client computing platform(s) 128 receiving input from the other players.

User profiles may be linked (e.g., user profile database may be accessed by external resource(s) 130 upon approval from the user) to interactive, electronic social media, which may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

Although modules 106, 108, 110, and/or 112, are illustrated in FIG. 1 as being co-located within a single processing unit, in implementations in which processor(s) 104 includes multiple processing units, one or more of modules 106, 108, 110, 112, and/or other modules may be located remotely from the other modules. The description of the functionality provided by the different described above is for illustrative purposes, and is not intended to be limiting, as any of modules 106, 108, 110, 112, and/or other modules may provide more or less functionality than is described. For example, one or more modules 106, 108, 110, 112, and/or other modules may be eliminated, and some or all of its functionality may be provided by other ones of 106, 108, 110, 112, and/or other modules. As another example, processor(s) 104 may be configured to execute one or more additional modules that may perform some or all of the functionality attributed below to one of 106, 108, 110, 112, and/or other modules.

Electronic storage 126 may comprise electronic storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor(s) 104, information received from server(s) 102, information received from client computing platform(s) 128, and/or other information that enables server(s) 102 to function as described herein.

The computer program modules may be configured to enable an expert or user associated with the given client computing platform(s) 128 to interface with system 100 and/or external resource(s) 130, and/or provide other functionality attributed herein to client computing platform(s) 128.

In the exemplary embodiment, client computing platform(s) 128 may be any computing devices comprising processors and software modules capable of executing the processes and tasks described herein. Non-limiting examples of client computing platform(s) 128 may include a mobile phone, a desktop computer, a laptop computer, a handheld computer, a tablet computing platform, a netbook, a personal data assistant, a smartphone, a gaming console, and/or other computing platforms. In other embodiments, client computing platform(s) 128 may be a variety of electronic computing devices. In some exemplary embodiments, the computing device may be referred to as a mobile device, but the embodiments are not intended to be limited to only a mobile device. The client computing platform 128 may include a user input device, such as a touchscreen interface, a mouse, a stylus, a keyboard, voice commands, or any other user input mechanism.

Each of the client computing platform(s) 128 may have distinct operating systems, or platforms. The client computing platform(s) 128 may be executing the same platform or the client computing platform(s) 128 may be executing different platforms. The client computing platform(s) 128 may be capable of executing multiple platforms. In some embodiments, client computing platform(s) 128 may be used by a software developer, user and/or other system administrator to control the server 102, over a network 132. In other embodiments, client computing platform(s) 128 may be targeted to receive test modules to execute.

A user may interact with a user interface that resides directly on the server(s) 102 for system administration and control. In other embodiments, client computing platform(s) 128 may be used to remotely conduct system administration. A given client computing platform(s) 128 may include one or more processor(s) 104 configured to execute computer program modules.

The external resource(s) 130 may include sources of information, hosts and/or providers of environments outside of system 100, external entities participating with system 100, and/or other resources. In some implementations, some or all of the functionality attributed herein to external resource(s) 130 may be provided by resources included in system 100.

The network 132 may comprise any common communication architecture that facilitates communication between computing devices, which in this embodiment the computing devices would be the server(s) 102 and the client computing platform(s) 128. One having ordinary skill in the art would appreciate that the network 132 may be the Internet, a private intranet, or some hybrid of the two.

Figure 2:
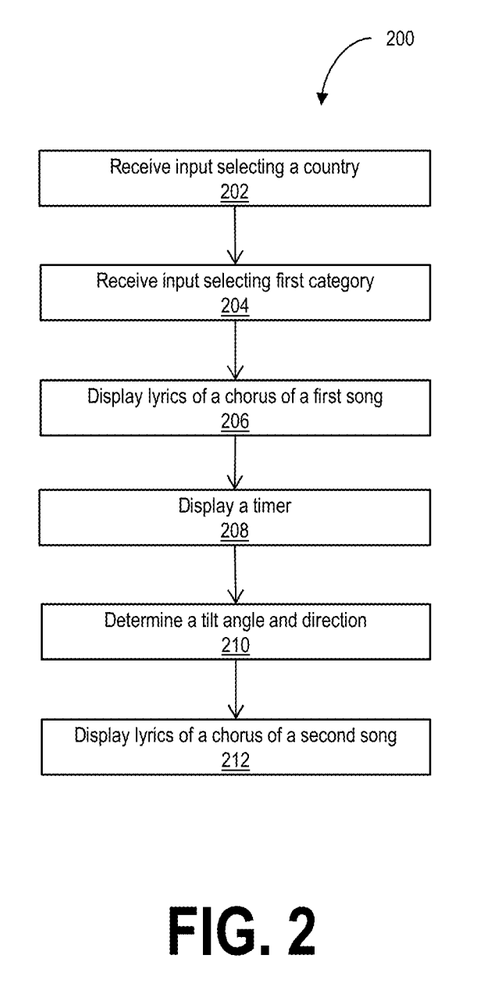
FIG. 2 illustrates a flow chart showing steps for a method for playing a game on a mobile device, according to an exemplary embodiment.

FIG. 2 illustrates a flow chart 200 showing steps for a method for playing a game on a mobile device, according to an exemplary embodiment. In some embodiments, the method for playing the game, may be accomplished with one or more additional steps not described, and/or without one or more of the steps discussed. Additionally, the order in which the steps of the method for playing the game are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 200 in response to instructions stored electronically on an electronic storage medium. The one or more processing devices may include one or more devices configured through hardware, firmware, and/or software to be specifically designed for execution of one or more of the steps of method 200.

At step 202, the computing device or other user input device of a client computing platform(s) 128 may receive an input from a user selecting a first country from a plurality of countries, the countries comprising a first country and a second country. In some implementations, the user may select a plurality of countries, and select from the corresponding plurality of categories of songs. The categories may comprise multiple countries including: the United States of America (US), India, China, Pakistan, Mexico, and/or any other country. Based on the type of country, different song options may be available for selection. In some implementations, genres may be presented for the US including: country, pop, rock and roll, hip hop, blues, jazz, gospel and/or any other genre. The electronic storage(s) 126 may store many databases based on different countries and songs for each country. Each county may have its own database and/or all of the information may be stored in a single database. The database may have records correlating to the song, including the country of the song and the genre of the song. The songs may be listed in the database alphabetically. The client computing platform(s) 128 accesses the database(s) upon receiving input from the user based on the country and genre. Once the client computing platform(s) 128 receives information from the user, the client computing platform(s) 128 may then access the correct database and/or access particular sections of the database based on the identified information.

The client computing platform(s) 128 may provide on its display, the option to select multiple countries. For example, if the client computing platform(s) 128 may access the category module 106 to provide the user an opportunity to select more than one country for a user is bi-lingual and/or listens to international music. The client computing platform(s) 128 may access the category module 106 to additionally provide the user the option to mix categories (e.g., select India and the United States). The countries may be displayed in any manner (e.g., allow the user to select countries from an alphabetical list and/or drop down menu). In some implementations, the category module 106 may provide a wild category for the country which mixes a selection of songs from multiple countries. In some implementations, step 202 may be performed by a category module the same as or similar to category module 106 (shown in FIG. 1 and described above).

At step 204, the computing device may receive an input from the user selecting a first category of songs from a plurality of categories of songs. In some implementations, the plurality of categories of songs are different for the first country and the second country. In some implementations, further categories (e.g., tiers) may be presented for each country, such as different songs may be presented by state and/or region based on the country. For example, for India, a first tier of the category may be a state and/or region, and the second tier of the category may comprise: male songs, female songs, duets, a wild category (e.g., including all categories) and/or any other category.

The client computing platform(s) 128 may provide the user an option to select multiple categories through implementing the category module 106. For example, one option may be able to mix categories (e.g., select India and female and male songs, select India and select at least 2 different states). In some implementations, the category may be a wild category, which mixes a selection of songs from multiple genres. In some implementations, a first country from a plurality of countries comprises categories of songs related to a genre of the first song. In some implementations, the genre of the first song comprises: country, pop, rock and roll, hip hop, blues, jazz and gospel. In some implementations, the genre of the first song comprises a wild category comprising all genres of songs. The wild category may mix songs, countries, regions, and/or genres. In some implementations, a second country from a plurality of countries comprises categories of songs comprising: female, male, duet, and classical. In some implementations, the categories of the first song comprises a wild category containing all categories of songs. The categories of songs may be accessed by the server(s) 102 from the electronic storage 126. In some implementations, step 204 may be performed by a category module the same as or similar to category module 106 (shown in FIG. 1 and described above). At step 206, the computing device may display lyrics of a chorus or refrain of a first song from the selected category of songs, wherein the chorus is the main verse of the first song. In some implementations, the chorus is a line or group of lines repeated at intervals in a song. Other verses of songs may also be presented to the user. For example, the user may choose to only see the first verse and/or last verse of the song. Options may be presented to the user for selection when selecting the categories initially presented. In some implementations, step 206 may be performed by a category module the same as or similar to category module 106 (shown in FIG. 1 and described above).

At step 208, upon displaying the lyrics of the chorus of the song on the client computing platform(s) 128, a timer indicating a predetermined threshold period of time may be displayed. In some implementations the predetermined threshold period of time is determined by an operator. In some implementations, the predetermined threshold period of time is input by the user. The timer may be set for any increment or time, and/or may be random for different songs. The user may set the timer and/or the timer may be preset by the software. The time can be used to provide a time limit per song and/or a time limit per turn (e.g., how many songs can the user guess correctly in two minutes). The user may be able to choose these options and/or the options may be predetermined by the software. In some implementations, step 208 may be performed by a timer module the same as or similar to timer module 108 (shown in FIG. 1 and described above).

At step 210, the computing device may determine a tilt angle and direction. In some implementations, when the computing device (e.g., client computing platform(s) 128) is tilted upward at a predetermined angle, the computing device may display lyrics of a chorus of a second song from the selected category of songs. In some implementations, when the computing device is tilted downward at a predetermined angle, the touch screen device may award a score, and display lyrics of a chorus of a second song from the selected category of songs. In some implementations, the predetermined angle is greater than 45 degrees.

A tilt-sensitive digital compass may include both the magnetometer and the accelerometer (and/or any other sensor), i.e., both the magnetometer and the accelerometer may be integrated into a single chip or client computing platform(s) 128. For example, an integrated magnetometer-accelerometer may include magneto-inductive sensors or magneto-resistive sensors with a 3-axis accelerometer in a single chip. Alternatively, the digital compass may incorporate a Hall-effect magnetic sensor. In other variants, the client computing platform(s) 128 and/or the accessory device may include a gyroscope in addition to the magnetometer and accelerometer.

The user and/or operator may set the tilt criteria including angle and/or effect. For example, the user may set a tilt angle of 45 degrees in an upward direction to mean "pass" and skip to the next song lyric. The user may set a tilt angle of 90 degrees in a downward direction to mean "award a point" and present the next song lyric. In some implementations, the tilt angles may be preselected by the software developer. In some implementations, step 210 may be performed by a tilt module the same as or similar to tilt module 110 (shown in FIG. 1 and described above).

The system and/or method may comprise determining, by the computing device, a first input and a second input from the user; when the computing device receives the first user input, displaying lyrics of a chorus of a second song from the selected category of songs, and when the computing device receives a second user input, awarding a score. In some implementations, the first user input is a skip the song input. In some implementations, the second user input is an award a point input.

The user may provide an input on the computing device by selecting "skip" and/or "point." For example, if the user decides to skip the song, the user may press an icon on the computing device to skip to the next song. If the user guesses the song correctly, the user may press an icon on the computing device to award a point and move to the next song.

At step 212, the computing device may display lyrics of the chorus of the second song from the selected category of songs, when the predetermined threshold period of time is exhausted. The predetermined threshold period of time may be any time increment set by the user or preset by the software developer (e.g., 30 seconds, two minutes, etc.) In some implementations, step 212 may be performed by a category module the same as or similar to category module 106 (shown in FIG. 1 and described above).

Figure 3:
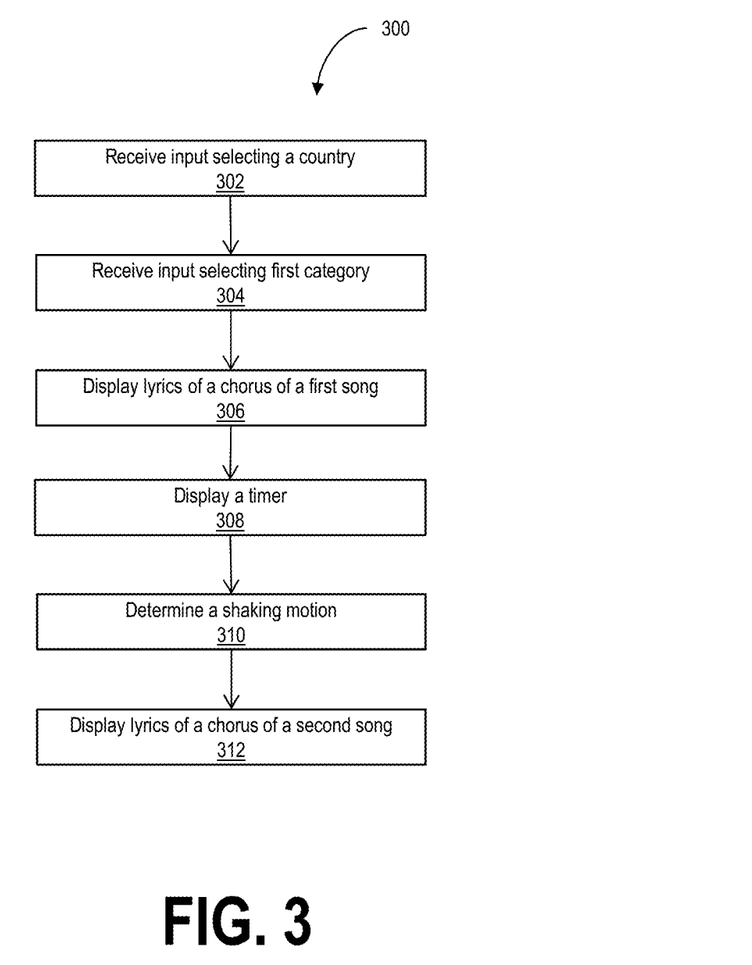
FIG. 3 illustrates a flow chart showing steps for a method for playing a game on a mobile device, according to an exemplary embodiment.

FIG. 3 illustrates a flow chart 300 showing steps for a method for playing a game on a mobile device, according to an exemplary embodiment. In some embodiments, the method for playing the game, may be accomplished with one or more additional steps not described, and/or without one or more of the steps discussed. Additionally, the order in which the steps of the method for playing a game, are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 300 in response to instructions stored electronically on an electronic storage medium. The one or more processing devices may include one or more devices configured through hardware, firmware, and/or software to be specifically designed for execution of one or more of the steps of method 300.

At step 302, the computing or other user input device of a client computing platform(s) 128 may receive an input from a user selecting a first country from a plurality of countries, the countries comprising a first country and a second country. In some implementations, the user may select a plurality of countries, and select from the corresponding plurality of categories of songs. The categories may comprise multiple countries including: the United States of America (US), India, China, Pakistan, Mexico, and/or any other country. Based on the type of country, different song options may be available for selection. In some implementations, genres may be presented for the US including: country, pop, rock and roll, hip hop, blues, jazz, gospel and/or any other genre.

In some implementations, the user may be able to select multiple countries. For example, if the user is bi-lingual and/or listens to international music, the user may be able to mix categories (e.g., select India and the United States). In some implementations, the country may be a wild category, which mixes a selection of songs from multiple countries. In some implementations, step 302 may be performed by a category module the same as or similar to category module 106 (shown in FIG. 1 and described above).

At step 304, the computing device may receive an input from the user selecting a first category of songs from a plurality of categories of songs. In some implementations, the plurality of categories of songs are different for the first country and the second country. In some implementations, further categories (e.g., tiers) may be presented for each country, such as different songs may be presented by state and/or region based on the country. For example, for India, a first tier of the category may be a state and/or region, and the second tier of the category may comprise: male songs, female songs, duets, a wild category (e.g., including all categories) and/or any other category.

In some implementations, the user may be able to select multiple categories. For example, the user may be able to mix categories (e.g., select India and female and male songs, select India and select at least 2 different states). In some implementations, the category may be a wild category, which mixes a selection of songs from multiple genres. In some implementations, a first country from a plurality of countries comprises categories of songs related to a genre of the first song. In some implementations, the genre of the first song comprises: country, pop, rock and roll, hip hop, blues, jazz and gospel. In some implementations, the genre of the first song comprises a wild category comprising all genres of songs. The wild category may mix songs, countries, regions, and/or genres. In some implementations, a second country from a plurality of countries comprises categories of songs comprising: female, male, duet, and classical. In some implementations, the categories of the first song comprises a wild category containing all categories of songs. In some implementations, step 304 may be performed by a category module the same as or similar to category module 106 (shown in FIG. 1 and described above).

At step 306, the computing device may display lyrics of a chorus of a first song from the selected category of songs, wherein the chorus is the main verse of the first song. Other verses of songs may also be presented to the user. For example, the user may choose to only see the first verse and/or last verse of the song. Options may be presented to the user for selection when selecting the categories initially presented. In some implementations, step 306 may be performed by a category module the same as or similar to category module 106 (shown in FIG. 1 and described above).

At step 308, upon displaying the lyrics of the chorus of the song on the computing device, the computing device may display a timer indicating a predetermined threshold period of time. In some implementations the predetermined threshold period of time is determined by an operator. In some implementations, the predetermined threshold period of time is input by the user. The timer may be set for any increment or time, and/or may be random for different songs. The user may set the timer and/or the timer may be preset by the software. The time can be used to provide a time limit per song and/or a time limit per turn (e.g., how many songs can the user guess correctly in two minutes). The user may be able to choose these options and/or the options may be predetermined by the software. In some implementations, step 308 may be performed by a timer module the same as or similar to timer module 108 (shown in FIG. 1 and described above).

At step 310, the computing device may determine a shaking motion. In some implementations, when the computing device (e.g., client computing platform(s) 128) is shaken horizontally, lyrics of a chorus of a second song from the selected category of songs is displayed. In some implementations, when the computing device is shaken vertically, a score is awarded, and lyrics of the chorus of the second song from the selected category of songs is displayed.

An inertial sensor may detect a user's shaking action and measure the strength of shaking. Then the inertial sensor may send a measured signal to the client computing platform(s) 128. The client computing platform(s) 128 may establish a threshold value based on the measured signal and orientation of the shake and store it into electronic storage 126.

The user and/or operator may set the shake criteria including direction and/or effect. For example, the user may set a shake direction of horizontal to mean "pass" and skip to the next song lyric. The user may shake direction of vertical to mean "award a point" and present the next song lyric. In some implementations, the shake direction may be preselected by the software developer. In some implementations, step 310 may be performed by a shake module the same as or similar to shake module 112 (shown in FIG. 1 and described above).

The user may provide an input on the computing device by selecting "skip" and/or "point." For example, if the user decides to skip the song, the user may press an icon on the computing device to skip to the next song. If the user guesses the song correctly, the user may press an icon on the computing device to award a point and move to the next song.

At step 312, the computing device may display lyrics of the chorus of the second song from the selected category of songs, when the predetermined threshold period of time is exhausted. The predetermined threshold period of time may be any time increment set by the user or preset by the software developer (e.g., 30 seconds, two minutes, etc.) In some implementations, step 312 may be performed by a category module the same as or similar to category module 106 shown in FIG. 1 and described above.

Figure 4:
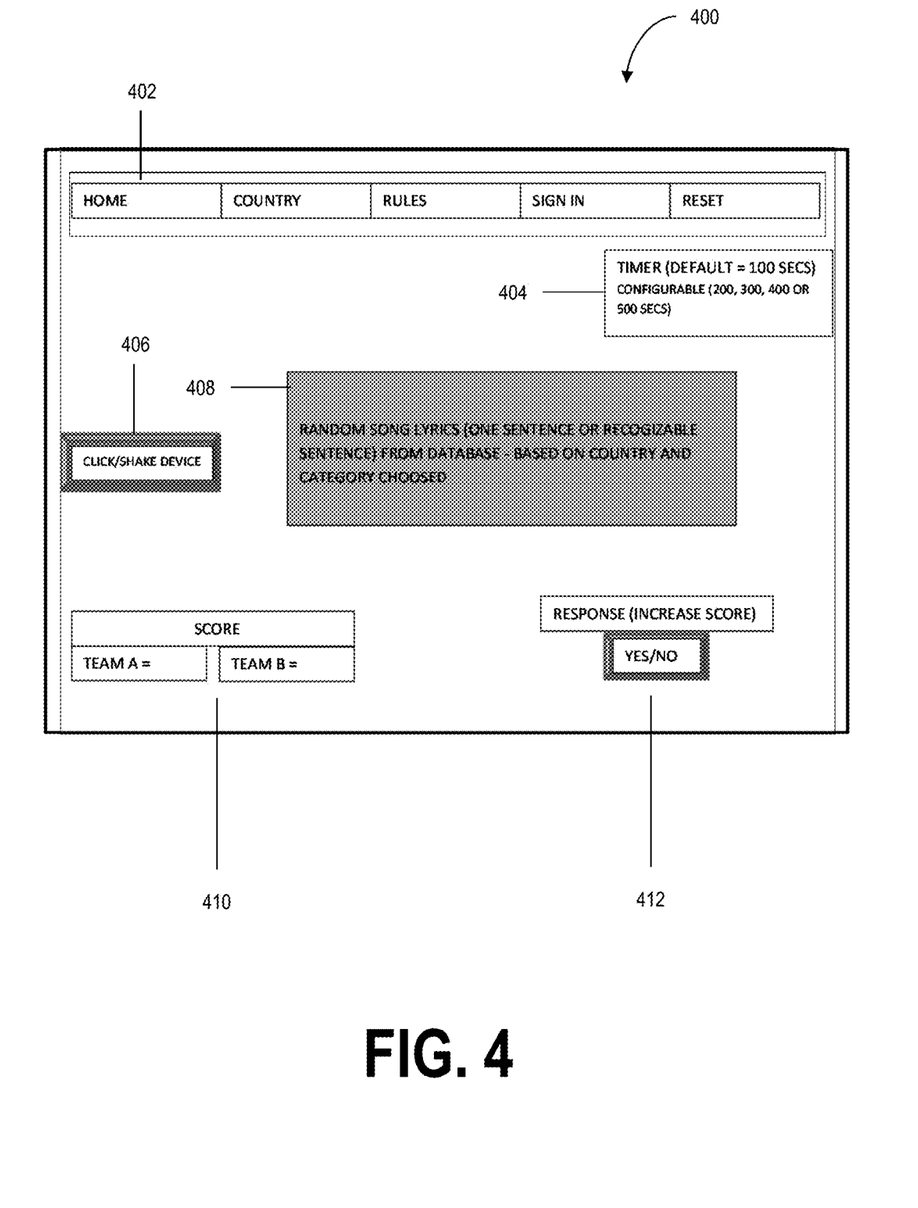
FIG. 4 illustrates a user interface for playing a game on a mobile device, according to an exemplary embodiment.

FIG. 4 illustrates a user interface for playing a game on a mobile device, according to an exemplary embodiment. In some implementations, the user interface may present an options bar 402. The options bar 402 may present the users with options comprising: home, country, rules, sign in, reset, click/shake device 406 and/or any other options. The home options may present the user with the first interface seen when starting the game. The country options may present the user with a list of countries to select for the songs. The rules options may display how to play the game. The sign in options may allow a user to sign in with a user profile. The reset options may allow a user to start the game over. The click/shake device 406 option may allow the user to choose whether they want to click on the device to receive the next song and/or shake the device to receive the next song. A tilt option may also be presented to the user.

When the user selects the click option, the user must click a particular button (e.g., an increase button 412) on the client computing platform 128 and a particular action may be taken in the game. For example, when the user correctly guesses the song, the user may select the increase button 412 and receive an added point to the score and see the next song lyric 408 displayed. In some implementations, when a user selects a tilt option, client computing platform 128 enables one or more sensors on the device and the processor starts monitoring the orientation of the device based on the sensors and automatically provides any alerts and/or actions based on certain rules (e.g., displaying the next song, automatically showing the score screen, adding a point to the team's score).

In some implementations, the timer 404 may be displayed on the user interface. The timer may be displayed digitally and/or may display a clock showing time remaining. The timer may be configurable by the user and/or the timer may be preset by the software developer.

In some implementations, the user may see the song lyric 408 on the computing device. The song lyric may be the main chorus of the song. The song lyric may be the beginning and/or end verse of the song. In some implementations, the user may be provided the option to select a part of the song they want displayed.

In some implementations, the score 410 may be displayed on the computing device. The score may be displayed for each team. There may be multiple teams depending on the options selected by the user. The score may be awarded in any incremental value.

Figure 5A:
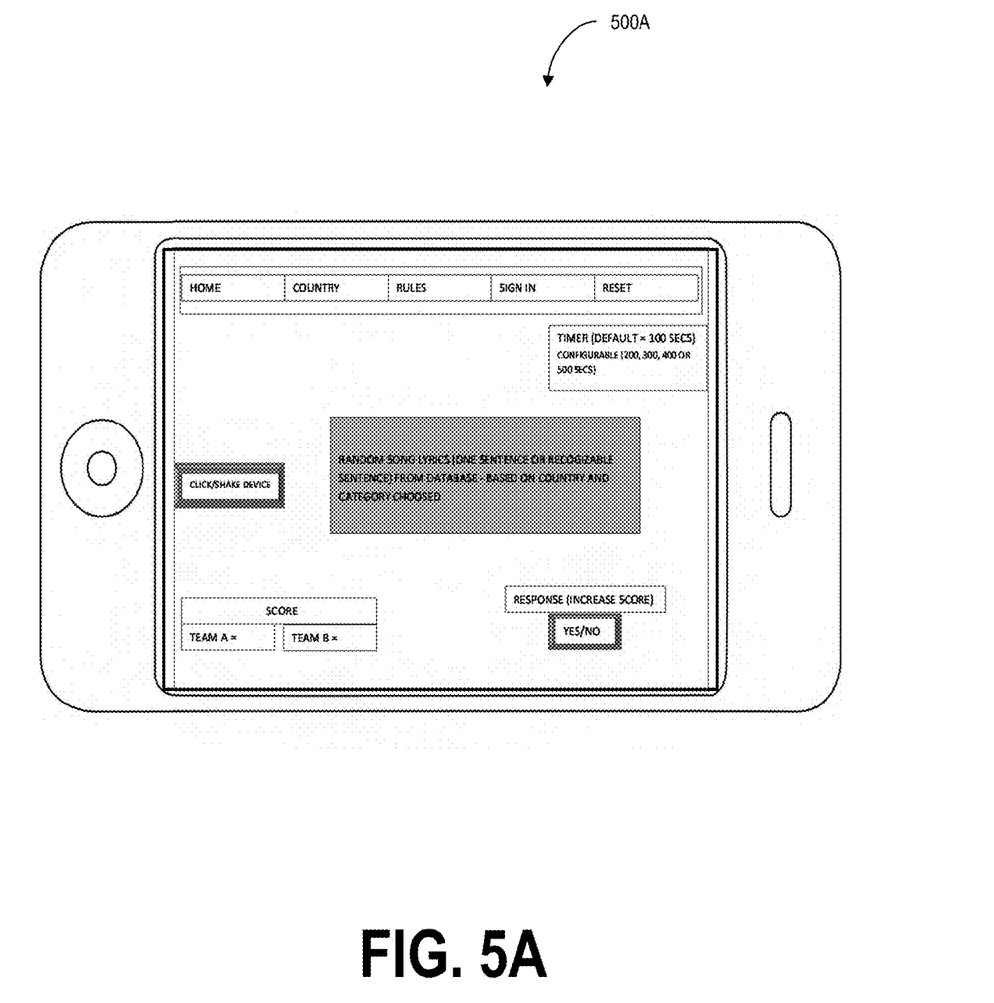
FIGS. 5A-5B illustrate a user interface for playing a game on a mobile device, according to an exemplary embodiment.
Figure 5B:
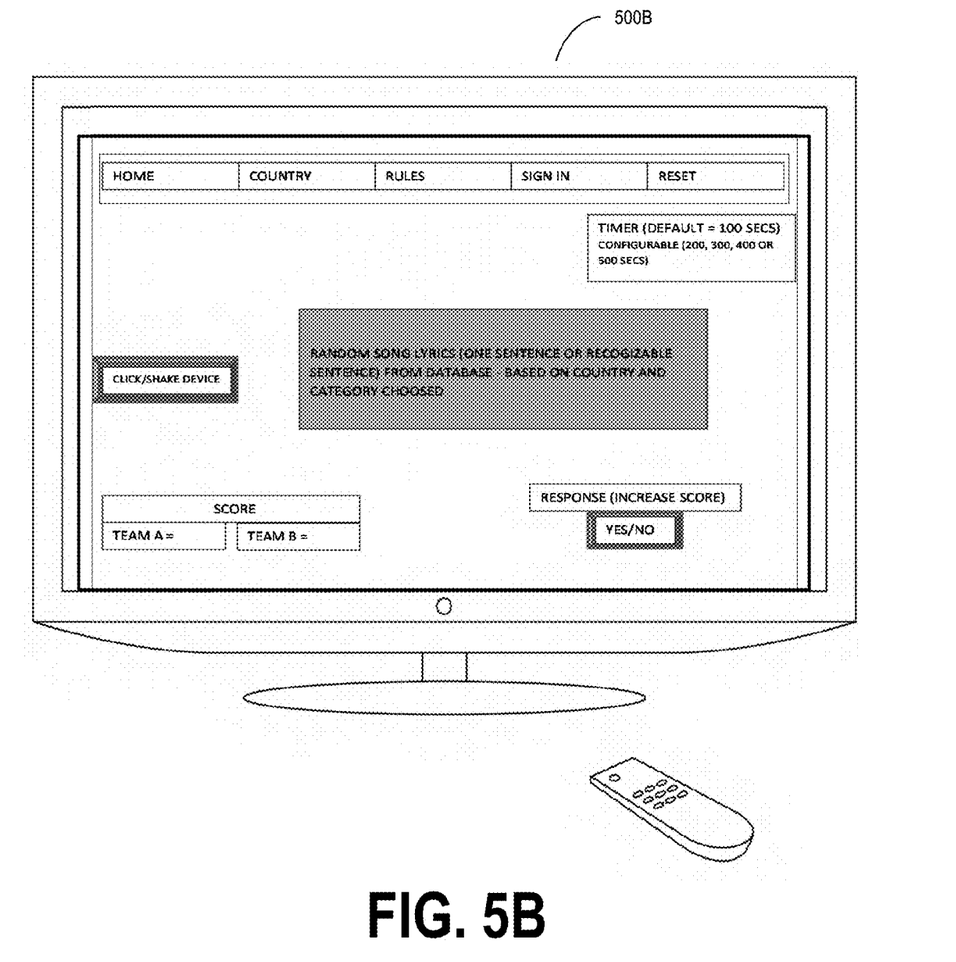

FIGS. 5A and 5B illustrate a user interface 500A and 500B for playing a game on a mobile device, according to an exemplary embodiment. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

The user may play the game on a mobile computing device 500A. The client computing platform(s) 128 may stream the game to a television and/or desktop 500B for the user to play the game. In this implementations, the user that would be guessing the song lyric would have their back to the big screen, while the second user who is acting out the song would be facing the big screen.

Figure 6:
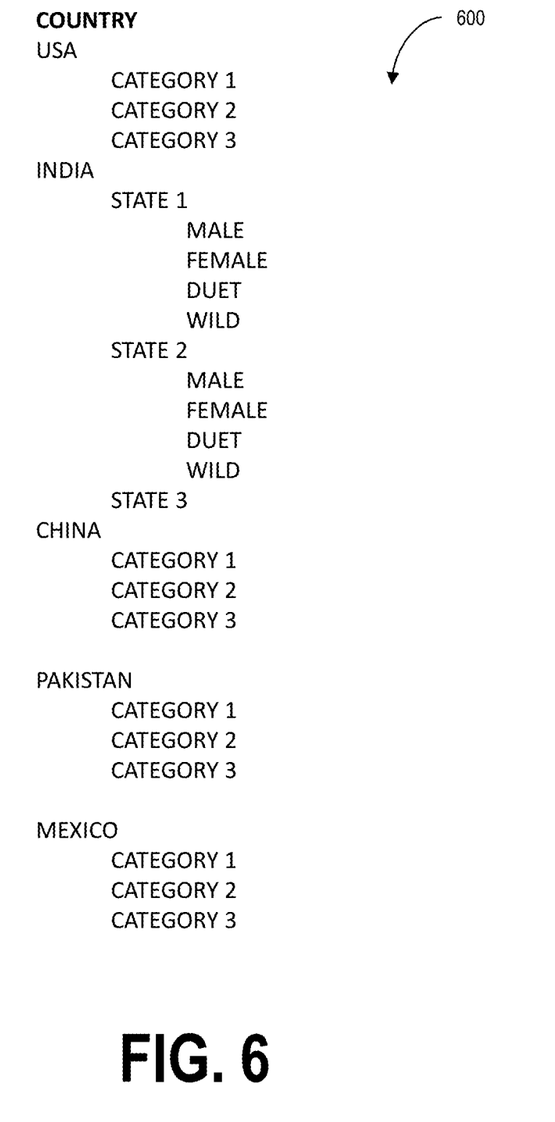
FIG. 6 illustrates a user interface for playing a game on a mobile device, according to an exemplary embodiment.

FIG. 6 illustrates types of categories 600 for playing a game on a mobile device, according to an exemplary embodiment. The categories may comprise multiple countries including: the United States of America (US), India, China, Pakistan, Mexico, and/or any other country. Based on the type of country, different song options may be available for selection. In some implementations, genres may be presented for the US including: country, pop, rock and roll, hip hop, blues, jazz, gospel and/or any other genre. In some implementations, further categories (e.g., tiers) may be presented for each country, such as different songs may be presented by state and/or region based on the country. For example, for India, a first tier of the category may be a state and/or region, and the second tier of the category may comprise: male songs, female songs, duets, a wild category (e.g., including all categories) and/or any other category.

It would be understood by one of ordinary skill in the art that the user interfaces may not be limited to the embodiment illustrated in FIGS. 4-6. The user interfaces may be associated with any objective, activity, action, or a combination thereof.

In some implementations, the game may be accessed by one or more users on a mobile device. The user would access the game application on their mobile device (e.g., smartphone, tablet). The mobile device may present a graphical user interface that allows two or more players to participate in the game using the mobile device and/or more than one mobile device (e.g., each player would link into the game and use their own mobile device to play). To play, the two or more players may select a song category. The categories may comprise song lyrics based on different countries. For example, in the United States, the category may be based on genre of music (e.g., pop). The user may select the pop category to play the game.

A first player may then hold the mobile device to their forehead or in a manner such that the first user cannot see the screen of the mobile device. At this time, the first player has a predetermined period of time (e.g., 60 seconds) where a main chorus and/or verse of a song from a particular category will appear on the screen to guess the song. In this case, the first song may be "All About That Base." While the song has many lyrics, the main chorus of the song happens to be: "I'm all 'bout that bass, 'bout that bass, no treble; I'm all 'bout that bass, 'bout that bass, no treble; I'm all 'bout that bass, 'bout that bass." Therefore, the words "I'm all 'bout that bass, 'bout that bass, no treble" may appear on the screen.

The second player and/or any other player may look at the screen and act out the verse of the song. For example, the second player may pretend that they are playing the bass drum. If the first player guesses the song correctly, the first player may tilt and/or shake the mobile device in a particular direction (e.g., up and/or down) and obtain a point. If the first player does not guess the song correctly and wants to take a pass on the particular song, the first player may tilt and/or shake the mobile device in an opposite direction (e.g., down and/or up). No points are awarded, and a second song appears on the mobile device. In some implementations, instead of tilting and/or shaking the mobile device, a user may select a tab and/or button on the mobile device to present the next song. The mobile device has a graphical user interface and database of song information to provide this functionality of the game. The game may continue for a predetermined period of time and the winner may be the player and/or team who guesses the most songs correctly.

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description. The scope of the system is instead defined by the following claims.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

The exemplary embodiments can relate to an apparatus for performing one or more of the functions described herein. This apparatus may be specially constructed for the required purposes and/or be selectively activated or reconfigured by computer executable instructions stored in non-transitory computer memory medium.

It is to be appreciated that the various components of the technology can be located at distant portions of a distributed network and/or the Internet, or within a dedicated secured, unsecured, addressed/encoded and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term "module" as used herein can refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer implemented method comprising:
   querying, by a computing device, a storage device for lyrics of a chorus of a first media record from a category of media records upon receiving an inputted selection of the category of media records from a plurality of category of media records;
   displaying, by the computing device, the lyrics of the chorus of the first media record from the selected category of media records;
   upon displaying the lyrics of the chorus of the first media record on the computing device,
      displaying, by the computing device, a timer indicating a predetermined threshold period of time;
      determining, by the computing device, a position of the computing device based upon data from a sensor in the computing device;

upon a determination that the computing device has changed the position beyond a first threshold amount, displaying, by the computing device, lyrics of a chorus of a second media record from the selected category of media records;

upon a determination that the computing device has changed beyond a second threshold amount,
   adjusting, by the computing device, a record to reflect a change in a score; and
   displaying, by the computing device, lyrics of a chorus of the second media record from the selected category of media records;

upon exhaustion of the predetermined threshold of time for displaying the lyrics of the chorus of the first media record without a determination that the computing device has changed the position beyond the first threshold amount and the second threshold amount, displaying, by the computing device, the second media record; and receiving, by a computing device, an input selecting a first country from a plurality of countries, the countries comprising a first country and a second country,
   wherein a first country from a plurality of countries media records related to a genre of the first media record comprises one or more of: country, pop, rock and roll, hip hop, blues, jazz and gospel, and
   wherein a second country from a plurality of countries comprises categories of media records comprising: female, male, duet, and classical.

2. The method of claim 1, wherein the sensor is one or more of: a gyroscope and an accelerometer.

3. The method of claim 1, wherein changing the position is based on tilt angle.

4. The method of claim 3, wherein the first threshold amount is tilting the device upwards beyond a 45 degree angle.

5. The method of claim 3, wherein the second threshold amount is tilting the device downwards beyond a 45 degree angle.

6. The method of claim 1, wherein changing the position is based on shaking the device.

7. The method of claim 6, wherein the first threshold amount is shaking the device vertically.

8. The method of claim 6, wherein the second threshold amount is shaking the device horizontally.

9. The method of claim 1, wherein the predetermined threshold period of time is determined by an operator.

10. A system comprising a processor configured to:
querying, by a computing device, a storage device for lyrics of a chorus of a first media record from a category of media records upon receiving an inputted selection of the category of media records from a plurality of category of media records;
displaying, by the computing device, the lyrics of the chorus of the first media record from the selected category of media records;

upon displaying the lyrics of the chorus of the first media record on the computing device,
   displaying, by the computing device, a timer indicating a predetermined threshold period of time;
   determining, by the computing device, a position of the computing device based upon data from a sensor in the computing device;

upon a determination that the computing device has changed the position beyond a first threshold amount, displaying, by the computing device, lyrics of a chorus of a second media record from the selected category of media records;

upon a determination that the computing device has changed beyond a second threshold amount,
   adjusting, by the computing device, a record to reflect a change in a score; and
   displaying, by the computing device, lyrics of a chorus of the second media record from the selected category of media records;

upon exhaustion of the predetermined threshold of time for displaying the lyrics of the chorus of the first media record without a determination that the computing device has changed the position beyond the first threshold amount and the second threshold amount, displaying, by the computing device, the second media record; and receiving, by a computing device, an input selecting a first country from a plurality of countries, the countries comprising a first country and a second country,
   wherein a first country from a plurality of countries media records related to a genre of the first media record comprises one or more of: country, pop, rock and roll, hip hop, blues, jazz and gospel, and
   wherein a second country from a plurality of countries comprises categories of media records comprising: female, male, duet, and classical.

11. The system of claim 10, wherein the sensor is one or more of: a gyroscope and an accelerometer.

12. The system of claim 10, wherein changing the position is based on tilt angle.

13. The system of claim 12, wherein the first threshold amount is tilting the device upwards beyond a 45 degree angle.

14. The system of claim 12, wherein the second threshold amount is tilting the device downwards beyond a 45 degree angle.

15. The system of claim 10, wherein changing the position is based on shaking the device.

16. The system of claim 15, wherein the first threshold amount is shaking the device vertically.

17. The system of claim 15, wherein the second threshold amount is shaking the device horizontally.

18. The system of claim 10, wherein the predetermined threshold period of time is determined by an operator.

\* \* \* \* \*